United States Patent
Rune et al.

(10) Patent No.: US 11,202,289 B2
(45) Date of Patent: Dec. 14, 2021

(54) BEAM SWEEP MEASUREMENT WINDOW

(71) Applicant: Telefonaktiebolaget LM Ericsson (publ), Stockholm (SE)

(72) Inventors: Johan Rune, Lidingö (SE); Icaro L. J. da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 100 days.

(21) Appl. No.: 16/499,634

(22) PCT Filed: Mar. 31, 2017

(86) PCT No.: PCT/SE2017/050316
§ 371 (c)(1),
(2) Date: Sep. 30, 2019

(87) PCT Pub. No.: WO2018/182471
PCT Pub. Date: Oct. 4, 2018

(65) Prior Publication Data
US 2020/0119800 A1    Apr. 16, 2020

(51) Int. Cl.
| | | |
|---|---|---|
| H04W 72/04 | (2009.01) | |
| H04W 24/10 | (2009.01) | |
| H04W 56/00 | (2009.01) | |
| H04W 72/00 | (2009.01) | |
| H04W 76/28 | (2018.01) | |
| H04B 7/06 | (2006.01) | |
| H04B 7/08 | (2006.01) | |

(52) U.S. Cl.
CPC ......... *H04W 72/046* (2013.01); *H04W 24/10* (2013.01); *H04W 56/0015* (2013.01); *H04W 72/005* (2013.01); *H04B 7/0617* (2013.01); *H04B 7/088* (2013.01); *H04B 7/0871* (2013.01); *H04W 76/28* (2018.02)

(58) Field of Classification Search
CPC ...... H04B 7/06; H04B 7/0408; H04B 7/0695; H04B 7/0617; H04B 7/00871; H04W 76/28; H04W 24/10; H04W 56/0015; H04W 72/005; H04W 72/046
See application file for complete search history.

(56) References Cited

U.S. PATENT DOCUMENTS

| | | | |
|---|---|---|---|
| 2014/0323144 A1 | 10/2014 | Kim et al. | |
| 2015/0304868 A1 | 10/2015 | Yu et al. | |
| 2016/0323075 A1* | 11/2016 | Jeong | H04L 5/0023 |
| 2018/0084593 A1* | 3/2018 | Chen | H04L 5/0048 |
| 2018/0192384 A1* | 7/2018 | Chou | H04W 72/044 |
| 2020/0036430 A1* | 1/2020 | Kim | H04W 24/10 |

FOREIGN PATENT DOCUMENTS

WO    2018142309 A1    8/2018

* cited by examiner

Primary Examiner — Kevin C. Harper
(74) Attorney, Agent, or Firm — Sage Patent Group

(57) ABSTRACT

The present disclosure relates to methods and arrangements for introducing a beam sweep measurement window comprising one or more measurement instants. When performed in a wireless device, the method comprises receiving (S61) one or more beams, each comprising at least one control signal comprising beam sweep properties and obtaining (S62) the beam sweep properties from the control signal. The method further comprises determining (S63), based on the obtained beam sweep properties, a beam sweep measurement window comprising one or more measurement instants.

22 Claims, 8 Drawing Sheets

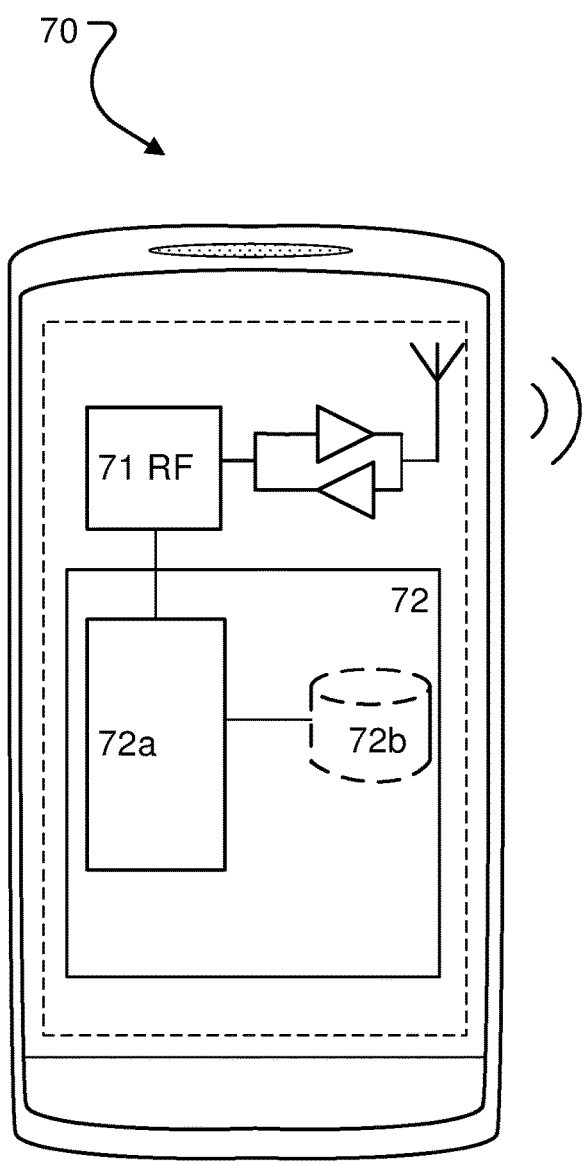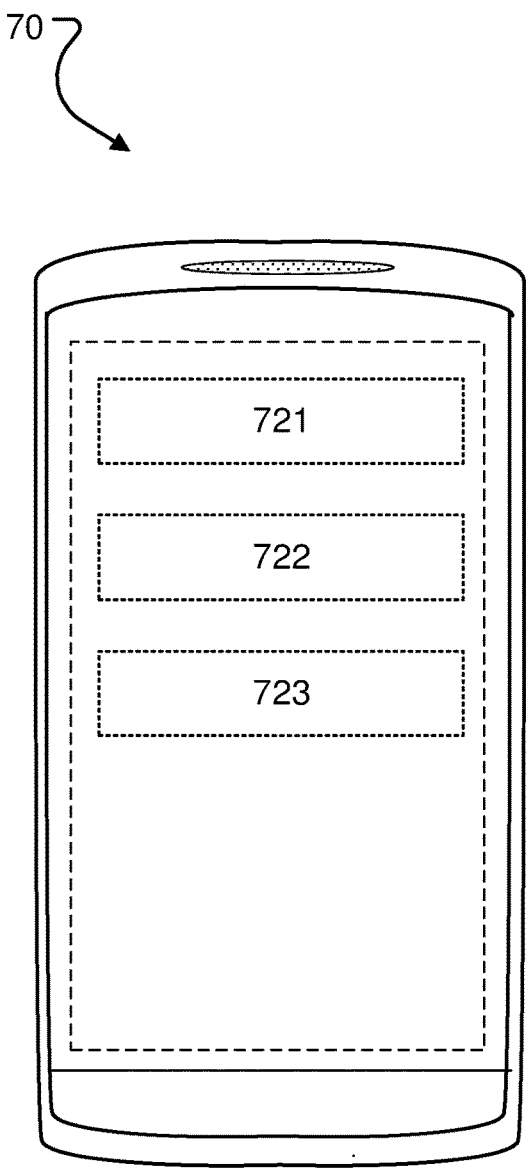
Fig. 7a
Fig. 7b

BEAM SWEEP MEASUREMENT WINDOW

TECHNICAL FIELD

The present disclosure relates generally to wireless communication and, more specifically, to a wireless communication network employing beam sweeping. The present disclosure presents methods, network nodes and computer program products for introducing beam sweep measurement instants in a wireless device.

BACKGROUND

The 3rd Generation Partnership Project, 3GPP, is responsible for standardization within the field of mobile telecommunication systems, e.g., for the standardization of the Universal Mobile Telecommunication System, UMTS, and Long Term Evolution, LTE. LTE is a continuously evolving technology for realizing high-speed packet-based communication that can reach high data rates both in the downlink and in the uplink; LTE allows for a system bandwidth of 20 MHz or up to 100 MHz when carrier aggregation is employed. In parallel to the LTE evolution, a $5^{th}$ generation system, 5G is currently being developed; where the radio access network is referred to as New Radio, NR, and the core network is referred to as Next Generation Core, NGC.

The 5G system will often be deployed in conditions where achieving appropriate coverage, e.g. cell edge coverage, may be challenging, thus resulting in low SNR/SINR. This is especially the case when high carrier frequencies, e.g. >6 GHz, are utilized. However, future cellular technology is expected to use advanced antenna systems to a large extent. With such antennas, signals may be transmitted in narrow transmission beams to increase signal strength in some directions, and/or to reduce interference in other directions. The beamforming will enable high data rate transmission coverage also to very distant users. Beamforming may be used at the transmitter, at the receiver, or both, e.g., by using a large antenna array at the network node and a small number of antennas at the wireless device. Thus, the problem of low SNR/SINR may be addressed by using high-gain beamforming, i.e. narrow beams, or repetition of the transmission.

While usage of large arrays with beamforming is usually viewed as a desirable phenomenon when transmitting data between one or more network nodes and designated wireless devices, not all types of signals are suitable for being transmitted employing directive beams. The benefits of beamforming is absent for information distribution of unsolicited data to wireless devices, e.g., for system information transmission, paging transmission, synchronization signal transmission, or for other types of broadcast transmissions. For such scenarios, a technique of employing so-called beam sweeping is considered where several directive beams are swept over a larger area. For the case of transmission of system information, SI, which has to be regularly distributed in an entire coverage area, e.g. an entire cell, the information is broadcast and intended for all wireless devices present in the coverage area. The wireless device present in the cell/coverage area may be reached by using the above mentioned beam sweeping of narrow beams and/or repetition of the transmissions, i.e., sequential transmissions of narrow beams until the entire coverage area has been covered that may or may not be repeated.

However, there are drawbacks and restrictions also when using beam sweeping for broadcasting system information. In conjunction with beam swept system information transmissions, a measuring wireless device may have to keep its receiver active for an extended period of time to monitor the beam sweep until it has sampled the same (best) beam multiple times. Even in scenarios where a single measurement sample may be enough to get a good enough measurement of a beam, the wireless device may have to keep its receiver active for a long time to ensure that it has monitored the entire beam sweep. This wastes energy in the wireless device, which counteracts the wireless device energy saving purpose of a camping wireless device in RRC_IDLE or RRC_INACTIVE state.

Also for a wireless device in an RRC_CONNECTED state, system information reception may be problematic in that system information reception may form an obstacle to reception of other DL data for a wireless device. The reason for this obstacle is that reception of other DL data simultaneously with reception of a system information, e.g., reception of a Synchronization Signal, SS, Block transmission, cause dynamic range problems, i.e., that the other DL data transmission, which uses high-gain beamforming tailored for the wireless device, is received with so much higher power than the SS Block transmission that the wireless device cannot properly receive the SS Block transmission; i.e., the other DL data transmission effectively drowns the SS Block transmission from the perspective of the measuring wireless device. This may force the network to configure an undesirably long so called measurement gap, during which the network refrains from transmitting DL data to the wireless device.

SUMMARY

It is an object of the present disclosure to provide solutions which seek to mitigate, alleviate, or eliminate one or more of the above-identified deficiencies in the art and to provide solutions for enabling more resource and energy efficient measurements in conjunction with beam sweeping.

This object is obtained by a method, for use in a network node, for introducing a beam sweep measurement window comprising one or more measurement instants. The method comprises obtaining one or more beam sweep properties for a beam sweep transmission. The method further comprises including information on the obtained beam sweep properties in at least one control signal and transmitting one or more beams comprising the at least one control signal.

The above presented method addresses the conflicting demands between measurement comprehensiveness and measurement effectiveness, e.g., in terms of energy consumption in the wireless device and the ability to receive downlink, DL, data. Thus, the method enables a more resource and energy efficient measurement procedure for beam swept information by including information on the beam sweep properties to receiving wireless devices. This makes the measurement procedure more streamlined.

According to some embodiments of the disclosure, the transmitting of the one or more beams comprises broadcasting the one or more beams in a beam sweep transmission with the obtained beam sweep properties.

According to other aspects of the disclosure, the transmitting of the one or more beams comprises broadcasting system information, SI, in a synchronization signal, SS, Block and/or in a primary or secondary Physical, Broadcast Channel, PBCH.

The object of the present disclosure is also obtained by a computer readable storage medium, having stored thereon a computer program which, when executed in a network node, causes the network node to execute the above disclosed method for introducing a beam sweep measurement window comprising one or more measurement instants.

The object of the present disclosure is also obtained by a network node arranged for introducing beam sweep measurement instants in a wireless device, the network node comprising radio circuitry arranged for transmission and reception of radio signals and processing circuitry. The processing circuitry is arranged to cause obtaining of one or more beam sweep properties for a beam sweep transmission, inclusion of information on the obtained beam sweep properties in at least one control signal, and transmission of one or more beams comprising the at least one control signal.

The network node and the computer program may have corresponding advantages as those described above in relation to the method for use in a network node, for introducing a beam sweep measurement window comprising one or more measurement instants.

According to a second aspect, the object of the present disclosure is obtained by a method for use in a wireless device, for introducing a beam sweep measurement window comprising one or more measurement instants. The method comprising receiving (S61) one or more beams each comprising at least one control signal comprising beam sweep properties. The method further comprises obtaining the beam sweep properties from the control signal and determining, based on the obtained beam sweep properties, a beam sweep measurement window comprising one or more measurement instants.

Thus, more energy and resource efficient measurements are enabled in conjunction with beam sweeping by obtaining beam sweep properties from network node information, which allows a wireless device to significantly shorten the time it has its receiver active.

Consequently, precious energy may be saved in the wireless device, which may be particularly important for wireless devices operating in RRC_IDLE or RRC_INACTIVE state, where energy saving is the prime purpose of the state.

According to some embodiments of the disclosure, the method further comprises updating a beam sweep reception procedure in the wireless device based on the determined customized beam sweep measurement window and applying the updated beam sweep reception procedure for one or more subsequent beam sweep cycles.

According to some embodiments of the disclosure, the beam sweep measurement window is used to control discontinuous reception, DRX.

The object of the present disclosure is also obtained by a computer readable storage medium, having stored thereon a computer program which, when executed in a wireless device, causes the wireless device to execute the above disclosed method for introducing a beam sweep measurement window comprising one or more measurement instants.

The object of the present disclosure is also obtained by a wireless device arranged for introducing a beam sweep measurement window comprising one or more measurement instants. The wireless device comprises radio circuitry arranged for transmission and reception of radio signals, and processing circuitry arranged to cause reception of one or more beams, each comprising at least one control signal comprising beam sweep properties The processing circuitry is further arranged to cause obtaining of the beam sweep properties from the control signal and determining of a beam sweep measurement window comprising one or more measurement instants, based on the obtained beam sweep properties.

The network node and the computer program may have corresponding advantages as those described above in relation to the method for use in a wireless device, for introducing a beam sweep measurement window comprising one or more measurement instants.

Advantages and effects achieved in the wireless device implementation are of course equally true for the network node implementation and vice versa.

BRIEF DESCRIPTION OF THE DRAWINGS

The foregoing will be more readily understood from the following detailed description of example embodiments, as illustrated in the accompanying drawings in which like reference characters refer to the same parts throughout the different views. The drawings are not necessarily to scale, emphasis instead being placed upon illustrating the example embodiments.

FIG. 7
a. illustrates an example wireless device configuration;
b. illustrates an example wireless device configuration.

ABBREVIATIONS

Figure 1A:
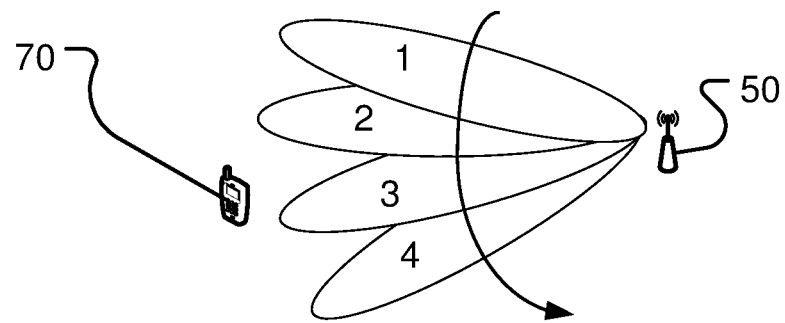
FIG. 1
a. illustrates transmission of a beam sweep from a network node having one transmission point;
b. illustrates a beam sweep transmitted from two separate transmission points.

3GPP $3^{rd}$ Generation Partnership Project
5G $5^{th}$ Generation
AS Access Stratum
DL Downlink
DRX Discontinuous Reception
eNB Evolved NodeB
FFS For Further Study
gNB The term for a 5G/NR eNB, i.e. a 5G/NR radio base station.
LTE Long Term Evolution
MIB Master Information Block
NR New Radio (The term used for the 5G radio interface and radio access network in the technical reports and standard specifications 3GPP are working on for a 5G mobile telecommunication system.)
PBCH Physical Broadcast Channel
PCI Physical Cell Identity
PDCCH Physical Downlink Control Channel
PDSCH Physical Downlink Shared Channel
PSS Primary Synchronization Signal
RRC Radio Resource Control
RX Receive/Reception
SFB Single Frequency Network
SI System Information SIB System Information Block
SINR Signal to Noise and Interference Ratio
SNR Signal to Noise Ratio
SS Synchronization Signal
SSS Secondary Synchronization Signal
TSS Tertiary Synchronization Signal
TX Transmit/Transmission
UE User Equipment

DETAILED DESCRIPTION

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

It should be noted that the word "comprising" does not necessarily exclude the presence of other elements or steps than those listed. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments.

In the following disclosure, the terms network node will be used to disclose a network infrastructure component that provide wireless access to a wireless device. Depending on the network type, other well-known terms for such a network entity are "base station", "BS," such as "eNodeB" or "eNB", or "access point." These terms may be used interchangeably and are used to refer to network infrastructure components that provide wireless access to wireless devices. Also, depending on the network type, other well-known terms may be used instead of "wireless device" such as "mobile station", "MS," "user equipment," "UE," "subscriber station," "remote terminal," "wireless terminal," or "user device." These terms may be used interchangeably to refer to remote wireless equipment that wirelessly accesses a network node, whether the wireless device is a mobile device (such as a mobile telephone or smartphone) or a stationary device or semi-stationary device, e.g., a sensor data reporting device set up for Machine Type Communication, MTC, in a wireless network structure.

In the context of this disclosure, the term network node is used to designate a node transmitting beams in a beam sweep to a receiving wireless device. Examples of network nodes are NodeB, base station, multi-standard radio, radio node, eNodeB, gNodeB, network controller, radio network controller, base station controller, relay, donor node controlling relay, base transceiver station, access point, transmission points, transmission nodes, nodes in distributed antenna system, DAS etc.

In support for higher frequencies in New Radio, NR, communication systems, beamforming is an essential component. Using antenna arrays at network nodes, fairly regular grid-of-beams coverage patterns with tens or hundreds of candidate beams per node may be created. The coverage area of an individual beam from such an antenna array may be small, down to the order of some tens of meters in width. Outside the beam area, quality degradations may occur quickly due to the limited coverage area of the beam. Beam sweep procedures are typically employed whereby a plurality of beams, e.g., comprising reference signals used for paging or synchronization or other type of system information signals, are sequentially transmitted in all necessary directions from the network node. "Necessary directions" here means all directions where coverage is desired.

Figure 1B:
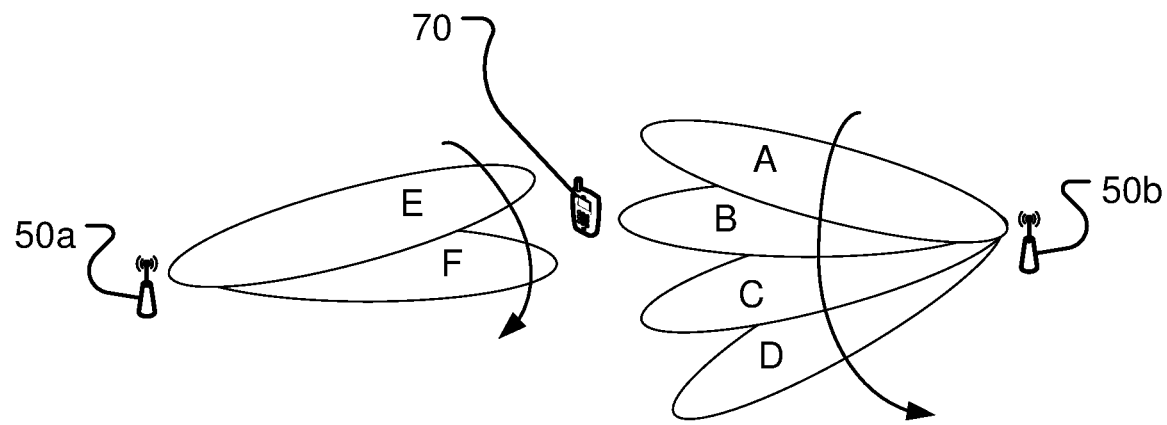

FIG. 1a illustrates a beam sweep comprising beams A-D and transmitted from a network node 50 having one transmission point. In the NR systems, it is also expected that one single network node might have several transmission points, as illustrated by network nodes 50a and b in FIG. 1b, where a first network node 50a transmits beams A-D to a receiving wireless device and a second network node 50b transmits beams E-F to the wireless device. A beam sweeping procedure is anticipated during paging of wireless devices or other types of transmission of unsolicited data toward an idle wireless device, e.g., other types of broadcast system information distribution. In high frequency bands, where narrow beams may be required, the beams in a sweep may add up to a substantial number. The paging information may be transmitted in one or a few OFDM symbols per beam.

System information, SI, is regularly distributed in a coverage area, e.g., a cell, during a beam sweeping procedure. The SI is broadcasted in the coverage area and intended for all wireless devices that are present in the coverage area. The wireless devices present in the coverage area/cell may be reached by beam sweeping of narrow beams, i.e. sequential transmissions of narrow beams over the coverage area.

Figure 2A:
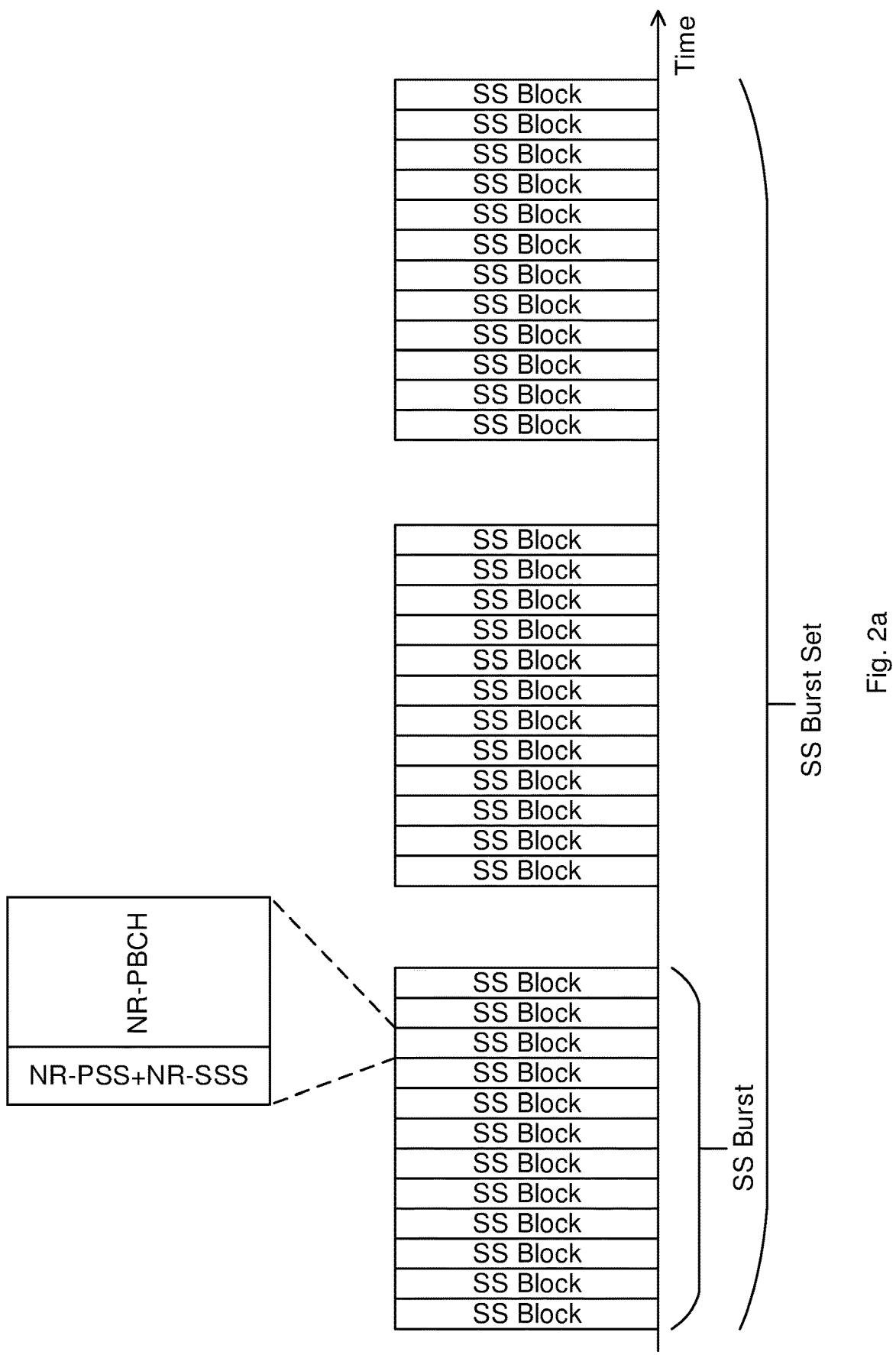
FIG. 2
a. schematically illustrates the concepts of SS Block, SS Burst and SS Burst Set;
b. schematically illustrates system information distribution and partitioning.

For NR it has been decided to divide the system information, SI, into "minimum SI" and "other SI", where the minimum SI is the SI that is required to access the cell. The minimum SI is periodically broadcast in a cell, while the other SI may be broadcast or delivered on demand, e.g. triggered by a random access preamble (RA Msg1) or a message 3 (RA Msg3) from a wireless device in idle or inactive mode, i.e. the "new state" (agreed for NR where the wireless device has a similar behavior as in idle but stores the AS context) or requested via Radio Resource Control, RRC, signaling from a wireless device in connected mode. It has also been decided to transmit a broadcast channel, denoted New Radio Physical Broadcast Channel, NR-PBCH, following a periodic synchronization signal consisting of the two parts New Radio Primary Synchronization Signal, NR-PSS, and New Radio Secondary Synchronization Signal, NR-SSS, from which the Physical Cell Identity, PCI can be derived. Together, the NR-PSS, NR-SSS, and NR-PBCH form an entity denoted Synchronization Signal, SS, Block. At least some of the minimum SI will be broadcast on the NR-PBCH, e.g. in the form of a Master Information Block, MIB. It is not decided whether all of the minimum SI, or which part(s) thereof, that will be transmitted on the NR-PBCH. Some of the minimum SI may be broadcast on another channel. It has further been agreed that a number of SS Block transmissions can be lumped together, i.e. transmitted in a tight series denoted "SS Burst". The notion of a "SS Burst Set" has also been agreed, where a SS Burst Set is a set of SS Bursts, typically with some non-zero interval between successive SS Burst transmissions. FIG. 2a schematically illustrates, on a timeline, the concepts of SS Block, SS Burst and SS Burst Set. SS Burst may for instance consist of the beam transmissions of a full beam sweep. However, there may also be reasons for not including a full beam sweep in a SS Burst, for instance if the number of beams in the sweep is comparably high and a full beam sweep would take longer time than allowed or desired for a SS Burst. In such a case, the beam sweep may be divided into multiple SS Burst, e.g. forming a SS Burst Set. A Tertiary Synchronization Signal, TSS, may be introduced which could indicate the symbol number in the subframe which in turn allows a wireless device to derive the subframe boundaries.

Figure 2B:
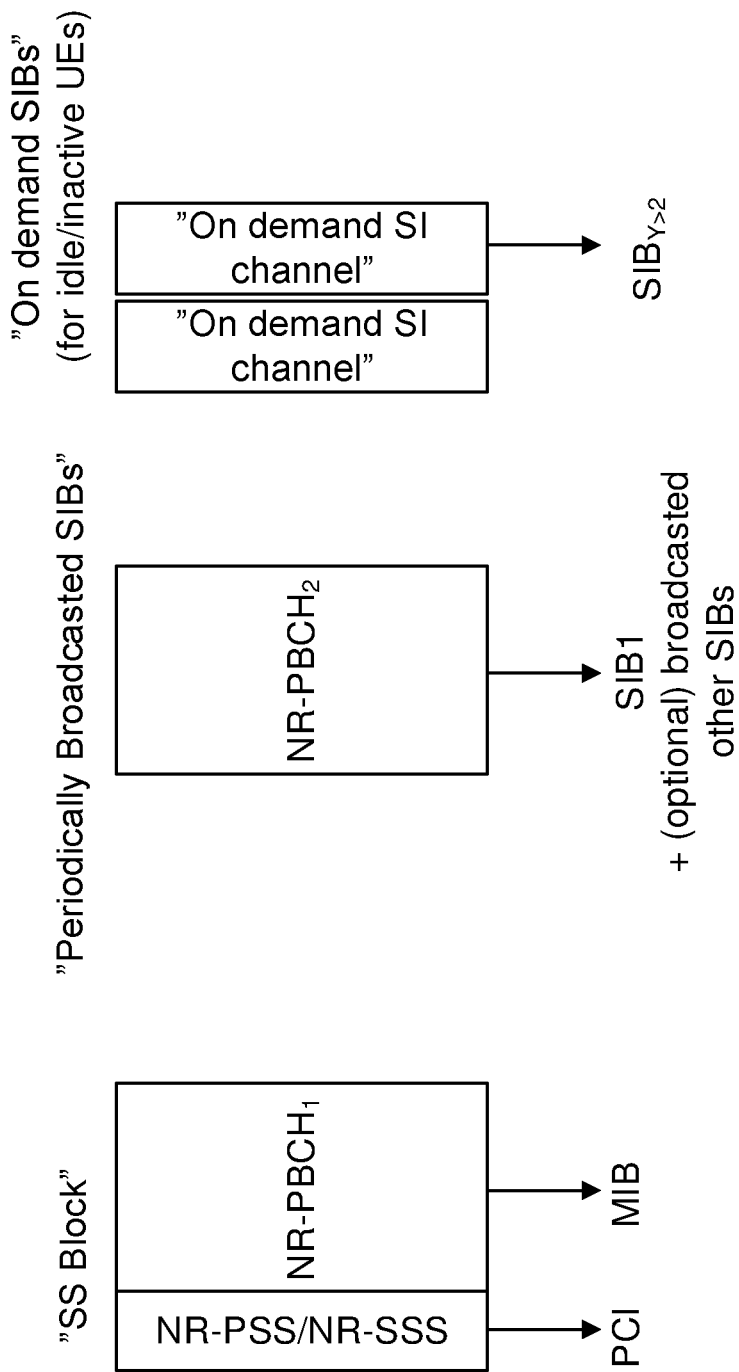

Turning to FIG. 2b, one proposed way of structuring the delivery of SI, and in particular of the minimum SI, in NR is depicted. FIG. 2b schematically illustrates system information distribution and partitioning. The minimum SI may be broadcast in two different parts on two different broadcast channels. The broadcast channels are tentatively referred to as the Primary PBCH (or NR-PBCH1) and Secondary PBCH (or NR-PBCH 2). The Primary PBCH is included in the SS Block and corresponds to the agreed NR-PBCH, i.e. it can be seen as the same channel but with another name. The part of the minimum SI broadcast on the Primary PBCH is here referred to as the Master Information Block, MIB, while the minimum SI part broadcast on the Secondary PBCH is structured in one or more System Information Block(s), SIB(s). The part of the minimum SI that is not broadcast on the Primary PBCH may alternatively be broadcast on a channel pair similar to the PDCCH+PDSCH in LTE, where the actual data (i.e. a part of the minimum SI in this case) is transmitted on the PDSCH and the PDCCH is used to control the transmissions on the PDSCH, where the control information on the PDCCH may for instance include scheduling and allocation of PDSCH transmission resources. (If this alternative is chosen, the Secondary PBCH may not exist and then the Primary PBCH would just be the PBCH (or NR-PBCH).) The MIB contains data that configures the Secondary PBCH, i.e. it contains information that allows a UE to detect, receive and decode the Secondary PBCH. The minimum SI broadcast on the Secondary PBCH, in turn, contains data that configures how "other SI" can be requested and delivered.

Measurements are performed by wireless devices in NR in all the three main states, idle (RRC_IDLE), inactive (i.e. the "new state" agreed for NR, tentatively denoted RRC_INACTIVE) and connected (sometimes also called "active") (RRC_CONNECTED). A wireless device in RRC_CONNECTED state performs measurements on neighbor cells (and the current cell) to support handovers. The wireless device reports measurement results to the network, which may use them to trigger a handover of the wireless device to a neighbor cell. A wireless device in RRC_INACTIVE or RRC_IDLE state performs measurements on cells neighboring the cell that the wireless device is camping on as well as on the cell it is camping on. Such measurements are performed to support cell reselection, i.e. switching from camping on one cell to camping on another, or initial cell selection when the wireless device is turned on or returns from out of coverage. In general, a wireless device may have to collect and average over multiple measurement samples of the same measurement source in order to get a good and reliable measurement result.

A wireless device in RRC_INACTIVE or RRC_IDLE state will assumedly perform its measurements on the SS Block transmissions of a neighbor cell. The wireless device may utilize the entire SS Block transmission, but the most important part for measurement is the NR-PSS+NR-SSS. It is even possible that only the NR-SSS will be used for measurements. This is subject to standardization in 3GPP. A wireless device in RRC_CONNECTED state may measure on either SS Block (mainly the NR-PSS+NR-SSS SSS or only the NR-SSS) transmissions or another type of reference signal provided for the purpose of wireless device RRC_CONNECTED state measurements. If beam sweeping of the SS Block transmissions is used, then the wireless device should only consider the measurement result on the best beam when assessing the quality of the concerned cell. A wireless device may be configured to consider multiple beams when assessing the quality of the concerned cell, e.g. the N best beams, but in such a case, the number N may be configured to 1.

As mentioned in the background section, a measuring, camping wireless device, i.e., in in RRC_IDLE or RRC_INACTIVE state, may have to keep its receiver active for an extended period of time to monitor the beam sweep until it has sampled the same (best) beam multiple times. Even in scenarios where a single measurement sample may be enough to get a good enough measurement of a beam, the wireless device may have to keep its receiver active for a long time to ensure that it has monitored the entire beam sweep. This represents an ineffective use of energy.

Also for a connected wireless device, i.e., in an RRC_CONNECTED state, system information reception may be problematic in that system information reception may form an obstacle to reception of other DL data for a wireless device.

The methods and wireless device aspects presented in this disclosure addresses the conflicting demands between measurement comprehensiveness and measurement effectiveness, e.g., in terms of energy consumption in the wireless device and the ability to receive DL data.

The proposed solution, that will be presented in more detail below, enables a wireless device to keep its receiver active during a shorter period while completing its measurements, whether multiple (for averaging) or single measurement samples are needed for each beam. This is achieved by providing easily accessible, lightweight information from the network node to one or more wireless nodes that allow a receiving wireless node to determine a beam sweep measurement window comprising one or more measurement instants when a discontinuous reception, DRX, receiver needs to be in an operative state. The operative instants of the beam sweep measurement window can be of different granularity, e.g., on OFDM symbol level or on subframe level, and the operative instants do not need to be time consecutive. In other words, the wireless device determines that the measurement instants are recurring according to a pattern defined by the beam sweep measurement window.

In addition, awareness of when a particular beam will be transmitted again allows the wireless device to streamline its measurement procedure, so that it monitors the downlink transmissions only when there are relevant downlink transmissions. During other intermediate time periods in the measurement procedure the wireless device can instead enter a low-power energy saving mode or conduct uplink and/or downlink data communication.

Figure 3:
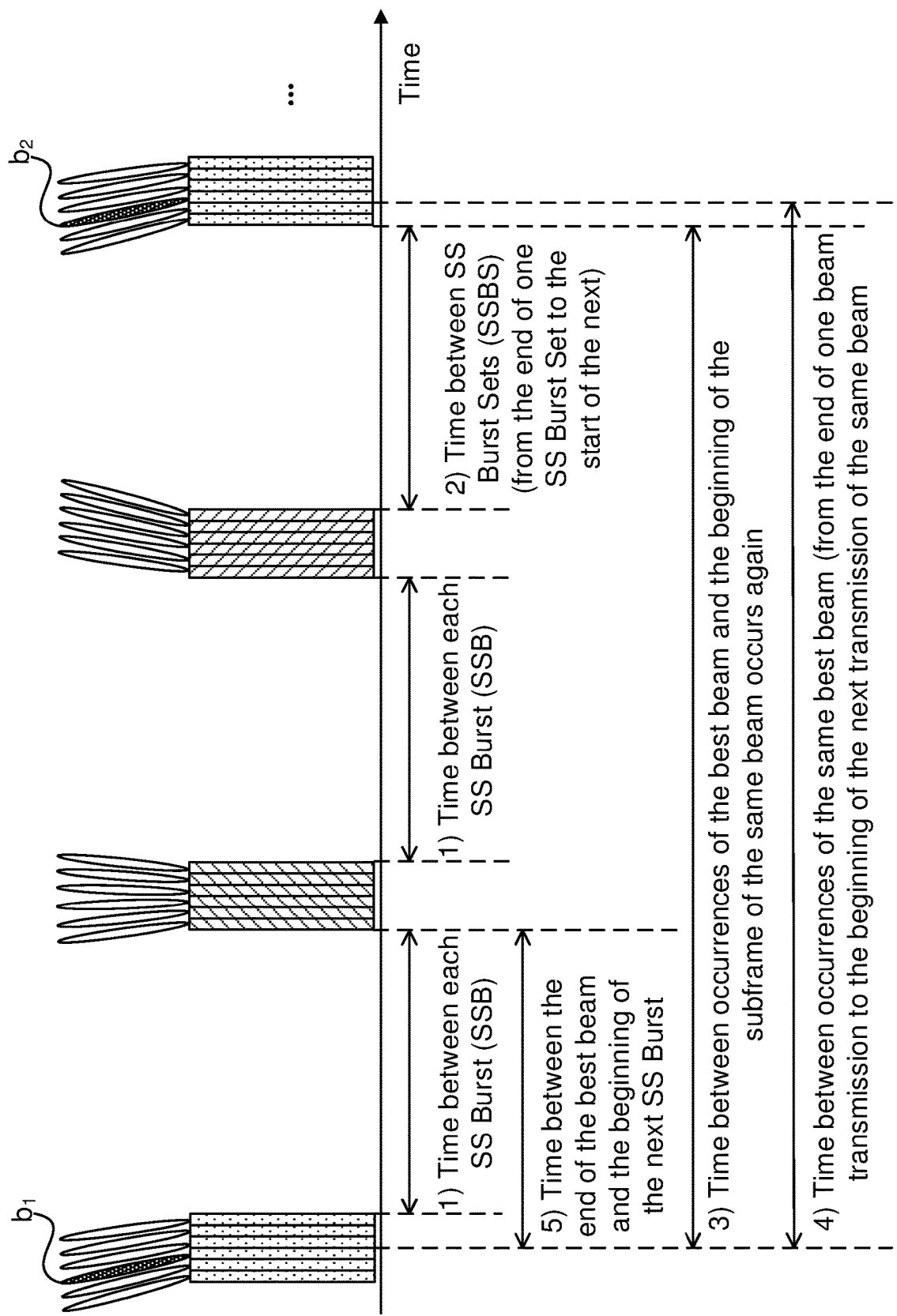
FIG. 3 schematically illustrates aspects of beam reception in a wireless device.

FIG. 3 schematically illustrates aspects of beam reception in a wireless device and presents examples of different time intervals when a wireless device could benefit from discontinuous reception, DRX, and turn off its receiver circuitry during one or more time durations in a beam sweep cycle. In FIG. 3, a beam indicated with a pattern, is identified as the best beam. As long as this beam continues to represent the best beam, there is no need for the wireless device to maintain a receiver active for the purpose of performing measurements on another beam. The wireless device uses the obtained best beam information to streamline its measurement procedure, so that it monitors the downlink for transmissions, e.g., for SS Block transmissions, only when there are relevant transmissions. During intermediate time periods in the measurement procedure the wireless device can instead enter a low-power energy saving mode or conduct uplink and/or downlink data communication. Such intermediate time periods when the wireless device may turn off its receiver include, for example 1) the time between SS Bursts, 2) the time between SS Burst Sets (SSBS), 3) the time between occurrences of the same (best) beam and the beginning of the subframe when the same beam occurs again, 4) the time between occurrences of the same (best) beam, and 5) the time between the end of the best beam and the beginning of the next SS Burst. A wireless device in RRC_IDLE or RRC_INACTIVE state may for instance limit its reception/monitoring and measuring to check whether it still has good enough coverage in its previous measured best beam before trying to find another beam to camp on in the cell (where this best beam may "represent" the cell). Note that the wireless device may also choose any integer multiple of these intervals, if measurement samples are needed with longer periodicity than the one defined by the network transmissions. Thus, FIG. 3 illustrates the benefits that may be achieved when a wireless device is capable of limiting measurements to one or more beams of a downlink beam sweep transmission.

Figure 4:
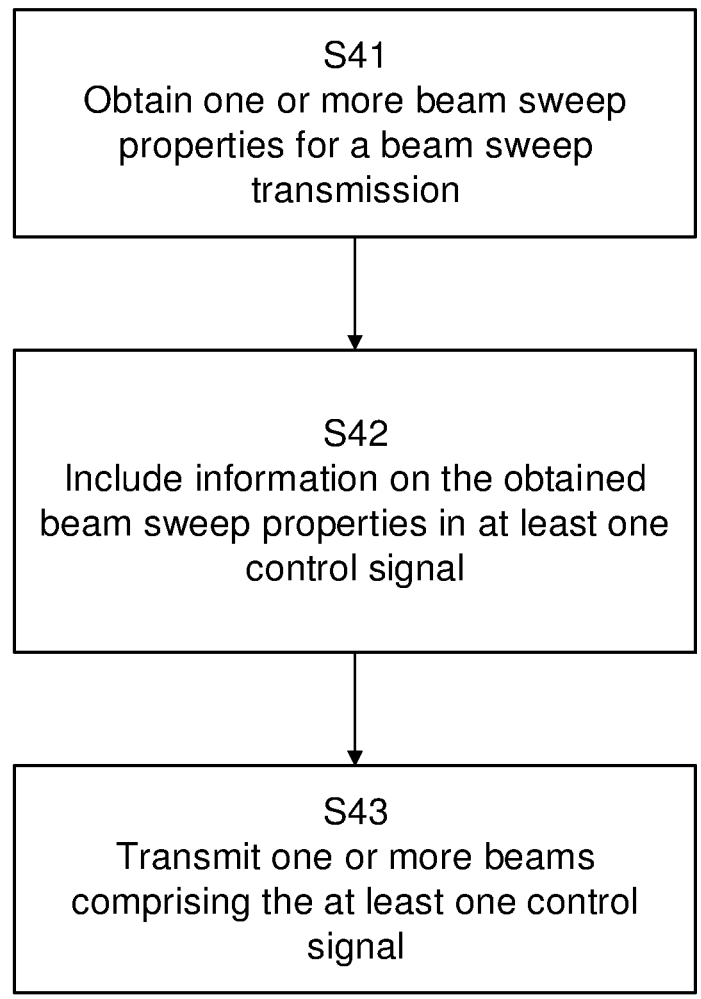
FIG. 4 is a flowchart illustrating exemplary method steps performed in a network node.

Turning to FIG. 4, a solution is outlined that enables a wireless device to keep its receiver active during a shorter period while completing its measurements, whether multiple (for averaging) or single measurement samples are needed for each beam. This is achieved by providing easily accessible, lightweight information from the network node to one or more wireless nodes that allow a receiving wireless node to determine a beam sweep measurement window comprising one or more measurement instants when a discontinuous reception, DRX, receiver needs to be in an operative state.

FIG. 4 illustrates, in a flowchart, exemplary operations performed in a network node of a wireless communication network. The disclosed method provides a solution for introducing a beam sweep measurement window comprising one or more measurement instant. The network node obtains S41 one or more beam sweep properties for a beam sweep transmission and includes S42 information on the obtained beam sweep properties in at least one control signal. One or more beams comprising the at least one control signals are transmitted S43 from the network node.

According to aspects of the disclosure, the obtained beam sweep properties are easily accessible information that may reflect a periodicity or duration of a beam sweep transmission and/or of individual beams in such a beam sweep transmission. According to aspects of the disclosure, beam sweep properties may be obtained from one or more of:
   a time until the same SS Block beam recurs, i.e., an SS Block beam sweep cycle interval time
   an SS Block beam sweep time duration,
   a number of beams in the SS Block beam sweep,
   a remaining time of the SS Block beam sweep,
   a remaining number of beams in the SS Block beam sweep,
   a time that has elapsed in the SS Block beam sweep,
   a transmission number for a specific beam in the SS Block beam sweep., e.g., how many beams that have been transmitted in the SS Block beam sweep
   an SS Burst, time duration,
   a number of beams in an SS Burst,
   a remaining time of an SS Burst,
   a remaining number of beams in an SS Burst,
   a time that has elapsed in an SS Burst,
   a transmission number for an identified beam in an SS Burst, e.g., how many beams that have been transmitted in the SS Burst,
   an inter-SS Burst interval or an SS Burst Set time duration,
   a number of SS Bursts in an SS Burst Set,
   a time remaining in the SS Burst Set,
   a number of SS Bursts remaining in the SS Burst Set,
   a time that has elapsed in the SS Burst Set,
   an SS Burst number in an SS Burst Set, e.g., how many SS Bursts that have been transmitted in an SS Burst Set,
   a transmission number for an identified beam in an SS Burst Set, e.g., how many beams that have been transmitted in the SS Burst Set, and
   a number of beams in an SS Burst Set.

As disclosed in FIG. 4, the network node includes S42 information on the obtained beam sweep properties in at least one control signal. There are a few options for how the beam sweep (and/or SS Burst) information can be provided to the wireless device, e.g., by broadcasting the one or more beams in a beam sweep transmission with the obtained beam sweep properties and including the beam sweep in a control signal comprising system information, SI. Beam sweep information may be provided on the on the NR-PBCH (or Primary PBCH) or through other parts of the SI. All the beam sweep information may be provided on the NR-PBCH (or Primary PBCH). This could be advantageous from a perspective of the measuring wireless device, which will not have to receive any other channel, such as the proposed Secondary PBCH or a channel pair similar to the PDCCH+PDSCH in LTE, to retrieve the information. However, it may be important to keep the size of the data transmitted on the NR-PBCH (or Primary PBCH) limited to enable efficient and robust SS Block transmission. Hence, a tradeoff may be considered, where parts of the beam sweep information is included in a transmission on the NR-PBCH (or Primary PBCH) and the remaining parts are included in the SI which is transmitted by other means, e.g. on another broadcast channel, such as the proposed Secondary PBCH, e.g., on a Physical Downlink Shared Channel, PDSCH, where the transmissions on the PDSCH are scheduled (and transmission resources are allocated) through signaling on the Physical Downlink Control Channel, PDCCH. Alternatively, if the wireless device has to receive SI transmissions outside the NR-PBCH (or Primary PBCH), e.g., on another broadcast channel such as the proposed Secondary PBCH or a channel pair similar to the PDCCH+PDSCH in LTE, to acquire some of the beam sweep information, then it may seem reasonable to transmit all of the beam sweep information together on this channel. Yet another SI part that may be considered for conveying, i.e., the including and transmitting of beam sweep (and/or SS Burst) information is the "other SI". Even though including all or parts of the beam sweep information in "other SI" would be feasible, it may be disadvantageous to require a measuring wireless device to request the concerned SI to be transmitted. Hence, according to embodiments of the disclosure, all of the beam sweep information is included in the minimum SI on the NR-PBCH (or Primary PBCH) and/or another channel, as described above. According to embodiments of the disclosure, the beam sweep information (and/or SS Burst information) may be included on the NR-PBCH (or Primary PBCH), as mentioned above. Assuming that efficient coding of the beam sweep (and/or SS Burst) information is used, e.g., the information on the beam sweep properties may be included by reference to one of a set of pre-defined beam sweep configurations, e.g., in the form of an index pointing out one out of a set of pre-defined configurations, the Primary PBCH is an option worth considering.

Consequently, the network node provides information on beam sweep properties to a receiving wireless device so that the wireless device may configure a beam sweep measurement window when a receiver in the wireless device is maintained in an active state. In the context of the present disclosure, a measurement instant is a time period during which a wireless device receiver is operative to monitor and perform measurements.

Yet another possibility is that some information is derived from signals transmitted outside the actual system information, e.g., from a signal in the SS Block. According to some embodiments of the disclosure the Secondary Synchronization Signal, SSS, or the Tertiary Synchronization Signal, TSS, are used to indicate, implicitly or explicitly, how far into the SS Block beam sweep or how far into the SS Burst beam sweep a certain beam transmission is located, e.g. which transmission number it has and/or how long time that has elapsed since the beginning of the SS Block beam sweep. Information could also be conveyed through implicit means. According to some embodiments of the disclosure, the beam sweep properties are implicitly indicated by the scrambling of the primary or secondary PBCH. Control information could also be transmitted or broadcasted in one or more beams transmitted separated from the beam sweep transmission having the obtained beam sweep properties, e.g., through Single Frequency Network, SFN, transmission from multiple transmission points simultaneously. This could, e.g., be the case if part of the minimum SI is broadcast using SFN transmission A principle of the above disclose method is to enable more energy and resource efficient measurements in conjunction with beam sweeping, e.g., measuring on the SS Block. Such energy and resource efficient measurements are enabled by providing from the network/network node information related to the beam sweep properties, e.g., the properties of SS Block beam sweeping and/or SS Bursts utilized in the cell, which allows a wireless device to significantly shorten the time it has its receiver active, e.g., for the purpose of monitoring the concerned downlink for SS Block transmissions. For the network, the method comprises providing, primarily in the system information and/or SS Block, information related to the properties of SS Block beam sweeping and/or SS Bursts utilized in the cell, thereby making this information accessible to UEs.

Figure 5A:
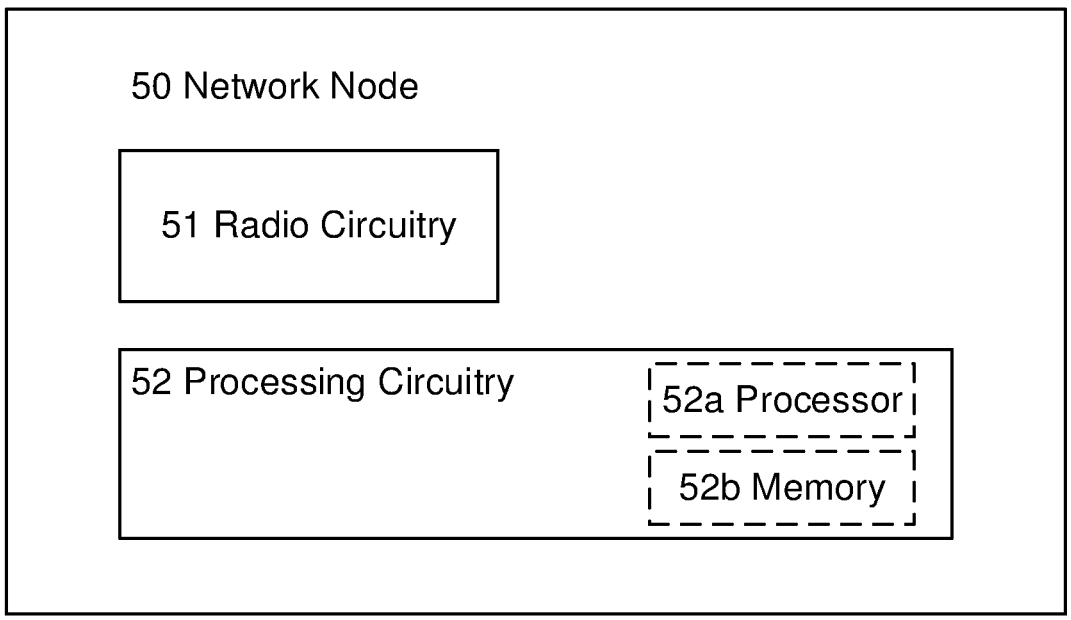
FIG. 5
a. illustrates an example network node configuration;
b. illustrates an example network node configuration.

FIG. 5a illustrates an example node configuration of a network node, which may incorporate some of the example embodiments discussed above. The network node is 50 introducing a beam sweep measurement window comprising one or more measurement instants in a wireless device. As shown in FIG. 5a, the network node 50 comprises radio circuitry 51 arranged to transmit and receive radio signals from one or more wireless device. It should be appreciated that the radio circuitry 51 may be comprised as any number of transceiving, receiving, and/or transmitting units or circuitry and that the radio circuitry may operate in half-duplex or full duplex transmission mode. It should further be appreciated that the radio circuitry 51 may be in the form of any input/output communications port known in the art.

Processing circuitry 52 is arranged to control operation of the network node. In particular, the processing circuitry 52 is configured to cause obtaining of one or more beam sweep properties for a beam sweep transmission; inclusion of information on the obtained beam sweep properties in at least one control signal; and transmission of one or more beams comprising the at least one control signal. The transmitting of one or more beams is caused by the processing circuitry 52, but is of course performed by the above discussed radio circuitry 51.

According to an aspect of the disclosure, the processing circuitry comprises a processor 52a and a memory 52b. The processor 52a may be any suitable type of computation unit or circuit, e.g. a microprocessor, digital signal processor, DSP, field programmable gate array, FPGA, or application specific integrated circuit, ASIC or any other form of circuitry. It should be appreciated that the processing circuitry need not be provided as a single unit but may be provided as any number of units or circuitry.

The memory 52b may be configured to store information received about the wireless device ranking order and/or the scheduling order. The memory 52b may further be configured to store received or transmitted data and/or executable program instructions. The memory 52b may be any suitable type of computer readable memory and may be of volatile and/or non-volatile type. According to an aspect of the disclosure, the processing circuitry comprises a processor 52a and a memory 52b. The processor 52a may be any suitable type of computation unit or circuit, e.g. a microprocessor, digital signal processor, DSP, field programmable gate array, FPGA, or application specific integrated circuit, ASIC or any other form of circuitry. It should be appreciated that the processing circuitry need not be provided as a single unit but may be provided as any number of units or circuitry.

Figure 5B:
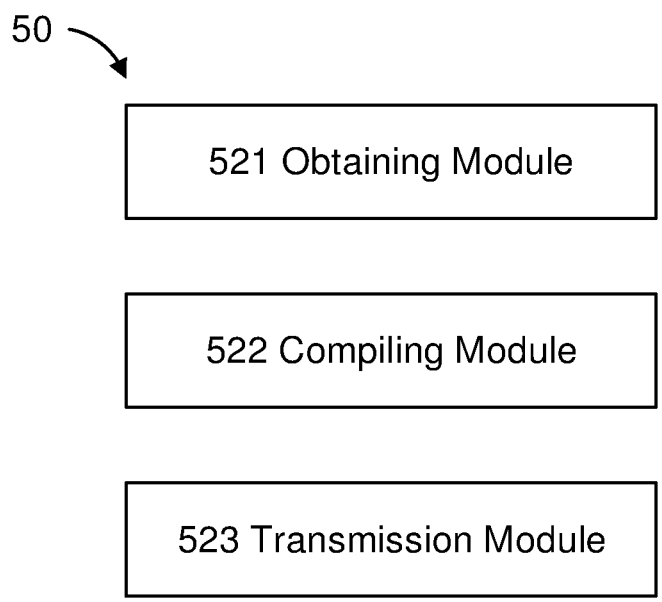

FIG. 5b illustrates an example node configuration of a network node, which may incorporate some of the example embodiments discussed above. The network node 50 is arranged for introducing a beam sweep measurement window comprising one or more measurement instants in a wireless device. The network node comprises an obtaining module 521 configured for obtaining one or more beam sweep properties for a beam sweep transmission; a compiling module 522 configured for including information on the obtained beam sweep properties in at least one control signal; and a transmission module 523 configured for transmitting one or more beams comprising the at least one control signal.

Figure 6:
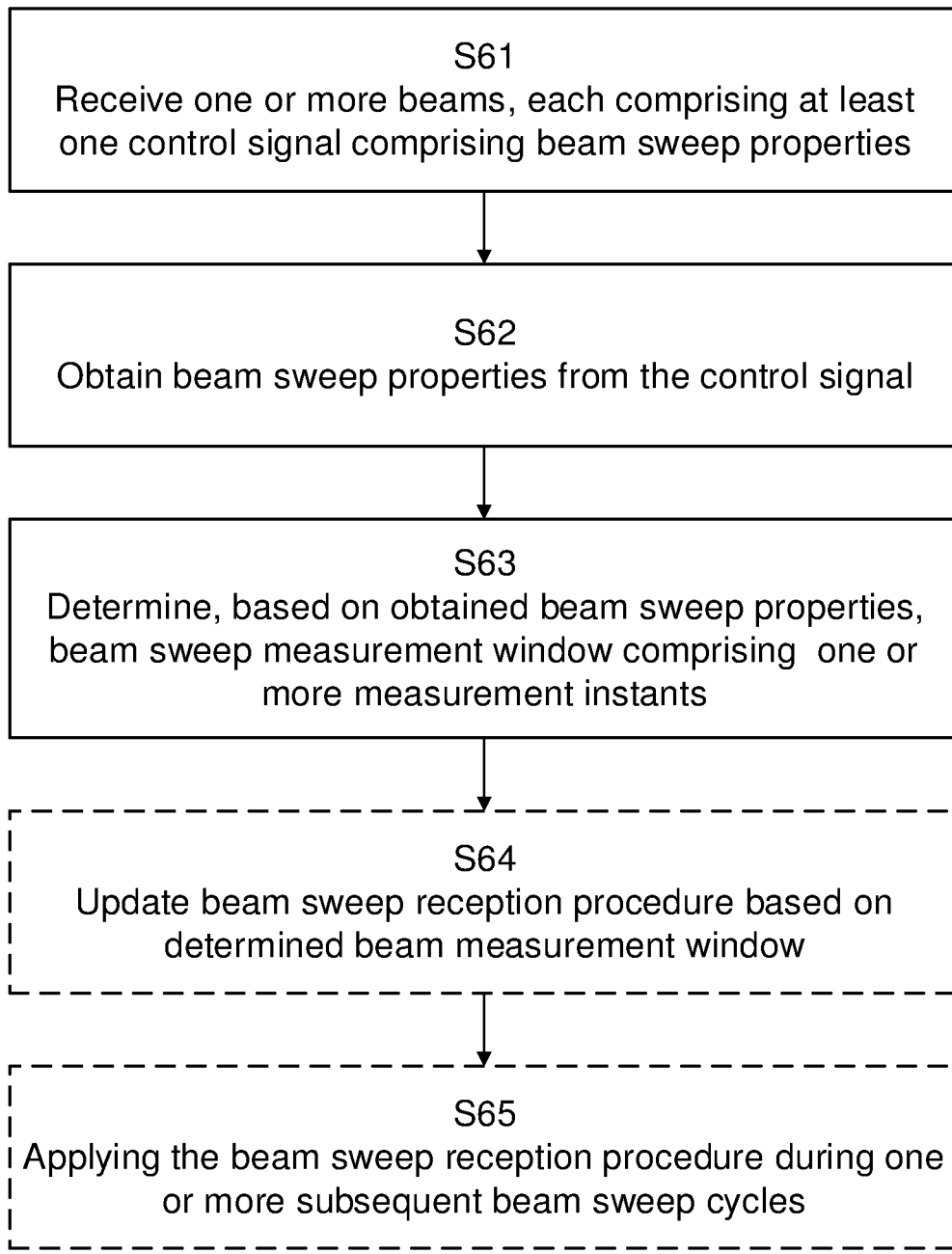
FIG. 6 is a flowchart illustrating exemplary method steps performed in a wireless device.

FIG. 6 illustrates, in a flowchart, exemplary operations performed in a wireless device of a wireless communication network. The disclosed method provides a solution for introducing a beam sweep measurement window comprising one or more measurement instant. The wireless device receives S61 one or more beams, each comprising at least one control signal comprising beam sweep properties. According to some embodiments of the disclosure, the control signal comprises system information, SI. According to some embodiments of the disclosure, the receiving of one or more beams is enabled during a time period corresponding to a beam sweep time duration. Thus, wireless device starts to monitor a selected, appropriate frequency band for transmissions, e.g., SS Block transmissions, during a time period sufficiently extended to encompass a full beam sweep cycle. When the UE detects a transmissions sufficiently, the wireless devices receives S61 the one or more beams. In an example embodiment where an SS Block is transmitted, beam sweep properties, e.g., SS Burst information, may be provided on the NR-PBCH as an SS Block beam sweep duration (which in this example is equal to a SS Burst duration), a remaining SS Block beam sweep time and/or an inter-SS Block beam sweep interval, i.e. the recurrence period of the same beam, which in this example is equal to the inter-SS Burst interval.

When the wireless device detects an SS Block transmission sufficiently well to decode the NR-PBCH, the wireless device reads the SS Block beam sweep/SS Burst information to obtain S62 the beam sweep properties. According to some embodiments of the disclosure, the beam sweep properties are obtained from a control signal received in a beam sweep transmission having the obtained beam sweep properties.

Turning back to FIG. 3, the detected beam may turn out to be in the middle of the SS Block beam sweep. Guided by the retrieved information, the wireless device keeps monitoring the second half of the SS Block beam sweep for further SS Block transmissions during the remaining SS Block beam sweep time and then goes to sleep until the beginning of the next SS Block beam sweep. This would imply that the wireless device reception may be inactivated for a time equal to the inter-SS Block beam sweep interval minus the SS Block beam sweep duration minus possible guard time, i.e. a margin, and circuitry start-up time. The wireless device then monitors the same frequency band for SS Block transmissions during the first half of the SS Block beam sweep and determines S63, based on the obtained beam sweep properties, a beam sweep measurement window comprising one or more measurement instants. Thus, following a time period corresponding to a full beam sweep cycle, the wireless device can determine which of the beams that was the best, e.g., the beam with the strongest/highest received power or RSRP, or the beam providing highest SNR/SINR.

Accordingly, the wireless device receives enabling information from the network, i.e., introducing the beam sweep measurement window. The actual use of this information, e.g., configuring the measurement window, may be left to the wireless device that may optimize its measurement behaviour in relation to whatever situation and conditions that it is subject to. This means that the wireless device can also take wireless device specific/internal matters into account, such as e.g. energy availability and/or battery status. Other specific aspects comprise considerations relating to the criticality of applications running or being supported in the wireless device.

The wireless device may then strive to sleep a lot, e.g., by possibly prioritizing/favouring sleeping over optimal measurements (e.g. sleeping a part of a beam sweep and thereby risking to miss a beam that, due to changes in UE location, UE rotation or radio environment, may have become the best beam), i.e., implementing an aggressive sleeping behaviour by updating S64 a beam sweep reception procedure in the wireless device. As illustrated, the best beam sweep reception is updated S64 based on the determined best beam and the obtained beam sweep properties, i.e., based on the determined beam sweep measurement window, and applying S65 the updated beam sweep reception procedure for one or more subsequent beam sweep cycles. As mentioned above, the wireless device may optimize its measurement behaviour in relation to whatever situation and conditions that it is subject to, taking wireless device specific/internal matters into account. For example in a situation where a critical application is running and requiring quick access, the wireless device may select a measurement window representing a less aggressive energy saving measurement behaviour than for a situation requiring a long battery life time. For the critical application, the wireless device may maintain a more extended measurement window in order to be really sure that the wireless device has the best possible conditions for accessing the network when the application needs it. Vice versa for a wireless device running less critical and less delay sensitive applications, e.g. a sensor feeding an application server with sensor data on a daily basis, a more aggressive behaviour may be selected. Another example of an aspect the wireless device could take into account is how much better the best beam is than other beams, e.g. the second best beam. If the best beam is far better than the second best, the wireless device may choose to wake up only to measure on the best beam. In other instances, the wireless device may choose to wake up to measure a selected few, e.g. the 2, 3 or 4 best beams, sacrificing some potential energy savings by waking up more frequently for the benefit of more optimal measurements and beam selection.

Thus, the determined beam sweep measurement window may be used to maximize the sleeping time. Reception in the wireless device may be inactivated until the next occurrence of the determined best beam. The measurement procedure for beam measurements may require repetition. If the determined best beam is located in the second half of the SS Block beam sweep, the wireless device may sleep only a short while and then sample the same best beam in the SS Block beam sweep. If the best beam is located in the first half of the SS Block beam sweep, the wireless device may sleep until the next SS Block beam sweep and then wake up to sample the best beam. The wireless device will then have sampled the best beam twice and determines whether it has gathered enough energy to arrive at a measurement result with sufficiently good quality and reliability. If not, the wireless device goes to sleep once more—guided by the inter-SS Block beam sweep interval (i.e. the wireless device sleeps during one inter-SS Block burst interval minus the duration of one beam transmission minus possible guard time (i.e. margin) and circuitry start-up time)—until the next occurrence of the same best beam and acquires a third sample. When the wireless device determines that it has combined enough samples, it terminates the measurement procedure and proceeds with other actions, e.g. assess cell reselection, report measurement result to a serving gNB, enter a low-power mode, or return to the previous operation. Note that if desired, the wireless device can replace a partial or full sleep period (in the above described measurement procedure) with other actions, such as data transmission and/or reception in a serving cell.

The wireless device may also use the averaged or soft-combined value as an input to a L1 and/or L3 filtering and, based on that, determine how to further adapt its sleeping behavior, i.e., the discontinuous reception, DRX. In one example, the wireless device that has selected a given beam as its best, e.g. based on an RSRP or SNR or SINR value, may also check whether the best beam is still within a certain level of quality and, unless the quality goes below a certain threshold, keep applying the aggressive sleeping strategy. If in one of the wake up intervals the channel quality (e.g. in terms of RSRP, SNR or SINR) of the best beam goes below a certain threshold (possibly configured) the wireless device may change its strategy to a more conservative (i.e. less aggressive) approach, such as monitoring and measuring on more (e.g. all) beams in the SS Block beam sweep, so that a new strongest beam could be detected—if available—for the cell that the wireless device is camping on. If the wireless device through this behavior finds new best beam with better channel quality than the previous one (and possibly above a certain threshold) the wireless device could switch back to an aggressive sleeping pattern, discontinuous reception pattern, and only wake up to monitor the best beam. Note that waking up to monitor the best beam may mean waking up right before the expected beam transmission or a few symbols before or some other time before to account for clock drift and/or circuitry startup time.

Consequently, when implementing the method for introducing a beam sweep measurement window comprising one or more measurement instants in a wireless device, the wireless device starts to monitor a relevant frequency band enabled for reception during a time period corresponding to a beam sweep time duration, e.g., for an SS Block transmission, an SS Burst transmission or a transmission of an SS Burst Set, wherein the SS Burst and the SS Burst Set comprises an SS Block.

The wireless device receives S61 one or more beams, each comprising at least one control signal comprising beam sweep properties, e.g., a control signal received in a beam sweep transmission having the obtained properties.

Receipt of the one or more beams implies detecting the SS Block transmission with sufficiently good quality to decode the NR-PBCH. The wireless device obtains S62 the beam sweep properties from the control signal, e.g., by reading the SS Block beam sweep/SS Burst information on the NR-PBCH. The wireless device may keep monitoring (and attempts to receive) SS Block transmissions for the remaining time (if any) of the SS Block beam sweep, even while having obtained beam sweep properties from the received beam sweep transmission. Consequently, the wireless device maintains the ability to one or more beams for at least the full time duration of a beam sweep cycle. Based on the obtained beam sweep properties, the wireless device determines S63 a beam sweep measurement window comprising one or more measurement instants. According to some embodiments of the disclosure, the beam sweep measurement window is configured to accommodate reception of beams during a time interval shorter than the beam sweep time duration. In the context of the present disclosure, a measurement instant is a time period during which a wireless device receiver is operative to monitor and perform measurements.

Using the determined beam sweep measurement window, the wireless device receiver may be altered between sleeping instants and operative instants, when the receiver is activated. The wireless device may sleep for a time equal to an inter-SS Block beam sweep interval minus the duration time of a SS Block beam sweep minus possible guard time (i.e. margin) and circuitry start-up time. When the receiver is activated, the wireless device monitors the beam sweep.

If the UE has not monitored a full SS Block beam sweep, the wireless device may monitor and attempt to receive the part of the SS Block beam sweep that remains. The UE monitors (and attempts to receive) the part of a full SS Block beam sweep that remains for the UE to monitor, starting at the beginning of the SS Block beam sweep. The wireless device determines the best beam of the SS Block beam transmissions that it has detected/received and determines a beam sweep measurement window comprising one or more measurement instants.

If the UE determines that it needs to retrieve one or more additional measurement sample of the determined best SS Block beam, then the above disclosed procedure may be repeated. The wireless device goes to sleep and wakes up to receive and measure on the next transmission of the determined best SS Block beam. That is, the wireless device sleeps for time equal to the inter-SS Block beam sweep interval plus or minus the offset time needed to arrive at the start of the next transmission of the determined best SS Block beam minus possible guard time (i.e. margin) and circuitry start-up time. The wireless device receives and measures on the transmission of the determined best SS Block beam.

The wireless device can optionally replace a partial or full sleep period (in the above described measurement procedure) with other actions, such as data transmission and/or reception in a serving cell.

According to some embodiments of the disclosure, the wireless device may acquire information about the SS Block beam sweep, SS Burst and/or SS Burst Set by monitoring the downlink during a sufficient time to cover an entire SS Burst. In this embodiment the wireless device monitors the downlink for sufficient time to cover an entire SS Burst, SS Burst cycle, SS Block beam sweep, SS Block beam sweep recurrence cycle, and/or SS Burst Set to obtain the relevant information, the beam sweep properties, from one or more of:

a time until the same SS Block beam recurs, i.e., an SS Block beam sweep cycle interval time
an SS Block beam sweep time duration,
a number of beams in the SS Block beam sweep,
a remaining time of the SS Block beam sweep,
a remaining number of beams in the SS Block beam sweep,
a time that has elapsed in the SS Block beam sweep,
a transmission number for a specific beam in the SS Block beam sweep, e.g., how many beams that have been transmitted in the SS Block beam sweep
an SS Burst, time duration,
a number of beams in an SS Burst,
a remaining time of an SS Burst,
a remaining number of beams in an SS Burst,
a time that has elapsed in an SS Burst,
a transmission number for an identified beam in an SS Burst, e.g., how many beams that have been transmitted in the SS Burst,
an inter-SS Burst interval or an SS Burst Set time duration,
a number of SS Bursts in an SS Burst Set,
a time remaining in the SS Burst Set,
a number of SS Bursts remaining in the SS Burst Set,
a time that has elapsed in the SS Burst Set,
an SS Burst number in an SS Burst Set, e.g., how many SS Bursts that have been transmitted in an SS Burst Set,
a transmission number for an identified beam in an SS Burst Set, e.g., how many beams that have been transmitted in the SS Burst Set, and
a number of beams in an SS Burst Set.

The wireless device may store the above information and when/if the wireless device subsequently measures on the same cell again, it may utilize the stored information to apply a more or less aggressive sleeping behavior, as described above.

A principle of the above disclose method is to enable more energy and resource efficient measurements in conjunction with beam sweeping, e.g., measuring on the SS Block. Such energy and resource efficient measurements are enabled by providing from the network/network node information related to the beam sweep properties, e.g., the properties of SS Block beam sweeping and/or SS Bursts utilized in the cell, which allows a wireless device to significantly shorten the time it has its receiver active, e.g., for the purpose of monitoring the concerned downlink for SS Block transmissions. When performed in the wireless device, the method comprises acquiring information related to beam sweep properties, e.g., properties of SS Block beam sweeping and/or SS Bursts utilized in the cell, as provided by the network. Information on the beam sweep properties are used to derive a beam sweep measurement window comprising time periods during which the wireless device does not have to monitor the downlink. The determined beam sweep measurement window may be used to update and apply a beam sweep reception procedure in the wireless device whereby the wireless device enters a low-power energy saving state or is capable of transmitting or receiving data during said time periods during which the wireless device does not have to monitor the downlink.

FIG. 7a is an example configuration of a wireless device 70, which may incorporate some of the example embodiments discussed above. The wireless device 70 is configured introducing a beam sweep measurement window comprising one or more measurement instants. As shown in FIG. 7a, the wireless device comprises receiver circuitry 71 arranged for reception of radio signals received as beams in a beam sweep from a transmitting network node. It should be appreciated that the receiver circuitry 71 may be comprised as any number of receiving units or circuitry. It should further be appreciated that the receiver circuitry 71 may be in the form of any input communications port known in the art.

The wireless device further comprises processing circuitry arranged to control operation of the wireless device. In particular, the processing circuitry 72 is configured to cause the wireless device to receive one or more beams, each comprising at least one control signal comprising beam sweep properties. Following receipt of the one or more beams, the processing circuitry 72 is configured to cause the wireless device to obtain the beam sweep properties from the control signal and to determine a beam sweep measurement window comprising one or more measurement instants, based on the obtained beam sweep properties.

According to an aspect of the disclosure, the processing circuitry comprises a processor 72a and a memory 72b. The processor 72a may be any suitable type of computation unit or circuit, e.g. a microprocessor, digital signal processor, DSP, field programmable gate array, FPGA, or application specific integrated circuit, ASIC or any other form of circuitry. It should be appreciated that the processing circuitry need not be provided as a single unit but may be provided as any number of units or circuitry.

The memory 72b may further be configured to store received data and/or executable program instructions. The memory 72b may be any suitable type of computer readable memory and may be of volatile and/or non-volatile type.

FIG. 7b also illustrates an embodiment of a wireless device 70 configured for introducing beam sweep measurement instants in a wireless device. The wireless device 70 comprises a reception module (721) configured for receiving one or more beams, each comprising at least one control signal comprising beam sweep properties, an obtaining module (722) configured for obtaining the beam sweep properties from the control signal, and a determination module (723) configured for determining a beam sweep measurement window comprising one or more measurement instants, based on the obtained beam.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of source nodes, target nodes, corresponding methods, and computer program products. It should be appreciated that the example embodiments presented herein may be practiced in combination with each other.

The invention claimed is:

1. A method, for use in a network node, for introducing a beam sweep measurement window comprising one or more measurement instants, the method comprising:
   obtaining one or more beam sweep properties for a beam sweep transmission;
   including information on the obtained beam sweep properties in at least one control signal; and
   transmitting one or more beams comprising the at least one control signal, wherein transmitting of the one or more beams comprises broadcasting system information (SI) in a synchronization signal (SS) Block and/or in a primary or secondary Physical Broadcast Channel (PBCH), and
   wherein Secondary Synchronization Signal (SSS) or Tertiary Synchronization Signal (TSS) are used to indicate, implicitly or explicitly, how far into the SS Block beam sweep a certain beam transmission is located.

2. The method of claim 1, wherein the transmitting of the one or more beams comprises broadcasting the one or more beams in a beam sweep transmission with the obtained beam sweep properties.

3. The method of claim 1, wherein the control signal comprises system information (SI).

4. The method of claim 1, wherein transmitting of the one or more beams comprises broadcasting the SS Block in an SS Burst or SS Burst Set.

5. The method of claim 4, wherein the beam sweep properties comprise one or more of:
   SS Burst, time duration,
   number of beams in an SS Burst,
   remaining time of an SS Burst,
   remaining number of beams in an SS Burst,
   time that has elapsed in an SS Burst,
   transmission number for an identified beam in an SS Burst,
   inter-SS Burst interval or an SS Burst Set time duration,
   number of SS Bursts in an SS Burst Set,
   time remaining in the SS Burst Set,
   number of SS Bursts remaining in the SS Burst Set,
   time that has elapsed in the SS Burst Set;
   SS Burst number in an SS Burst Set;
   transmission number for an identified beam in an SS Burst Set; and
   number of beams in an SS Burst Set.

6. The method of claim 1, wherein the beam sweep properties comprise one or more of:
   SS Block beam sweep cycle interval time
   SS Block beam sweep time duration,
   number of beams in the SS Block beam sweep,
   remaining time of the SS Block beam sweep,
   remaining number of beams in the SS Block beam sweep,
   time that has elapsed in the SS Block beam sweep, and transmission number for a specific beam in the SS Block beam sweep.

7. The method of claim 4, wherein the SSS or TSS are used to indicate, implicitly or explicitly, how far into the SS Burst beam sweep a certain beam transmission is located.

8. The method of claim 1, wherein the beam sweep properties are included by reference to one of a set of pre-defined beam sweep configurations.

9. The method of claim 1, wherein the beam sweep properties are implicitly indicated by the scrambling of the primary or secondary PBCH.

10. A network node arranged for introducing beam sweep measurement instants in a wireless device, the network node comprising:
    radio circuitry arranged for transmission and reception of radio signals;
    processing circuitry arranged to cause:
    obtaining of one or more beam sweep properties for a beam sweep transmission;
    inclusion of information on the obtained beam sweep properties in at least one control signal; and
    transmission of one or more beams comprising the at least one control signal,
        wherein the transmission of the one or more beams comprises broadcasting system information (SI) in a synchronization signal (SS) Block and/or in a primary or secondary Physical Broadcast Channel (PBCH), and
    wherein Secondary Synchronization Signal (SSS) or Tertiary Synchronization Signal (TSS) are used to indicate, implicitly or explicitly, how far into the SS Block beam sweep a certain beam transmission is located.

11. A method for use in a wireless device, for introducing a beam sweep measurement window comprising one or more measurement instants, the method comprising:
    receiving one or more beams, each comprising at least one control signal comprising beam sweep properties;
    obtaining the beam sweep properties from the control signal;
    determining, based on the obtained beam sweep properties, a beam sweep measurement window comprising one or more measurement instants;
    updating a beam sweep reception procedure in the wireless device based on the determined beam sweep measurement window; and
    applying the updated beam sweep reception procedure during one or more subsequent beam sweep cycles.

12. The method of claim 11, wherein the beam sweep properties are obtained from a control signal received in a beam sweep transmission having the obtained beam sweep properties.

13. The method of claim 11, wherein the control signal comprises system information (SI).

14. The method of claim 11, wherein the receiving of one or more beams is enabled during a time period corresponding to a beam sweep time duration.

15. The method of claim 11, wherein the beam sweep measurement window is configured to accommodate reception of beams during a time interval shorter than the beam sweep time duration.

16. The method of claim 11, wherein the beam sweep time duration is that of a synchronization signal, SS Block, SS Burst, or SS Burst Set.

17. The method of claim 16, wherein the beam sweep properties are obtained from one or more of:
    SS Burst time duration,
    number of beams in an SS Burst,
    remaining time of an SS Burst,
    remaining number of beams in an SS Burst,
    time that has elapsed in an SS Burst,
    transmission number for an identified beam in an SS Burst,
    inter-SS Burst interval or SS Burst Set time duration
    number of SS Bursts in a SS Burst Set,
    time remaining in the SS Burst Set,
    number of SS Bursts remaining in the SS Burst Set,
    time that has elapsed in the SS Burst Set,
    SS Burst number in an SS Burst Set,
    transmission number for an identified beam in an SS Burst Set, and
    number of beams in an SS Burst Set.

18. The method of claim 16, wherein the beam sweep properties are obtained from one or more of:
    SS Block beam sweep cycle interval time,
    SS Block beam sweep time duration,
    number of beams in the SS Block beam sweep,
    remaining time of the SS Block beam sweep,
    remaining number of beams in the SS Block beam sweep,
    time that has elapsed in the SS Block beam sweep, and
    transmission number for a specific beam in the SS Block beam sweep.

19. The method of claim 11, wherein the updated beam sweep reception procedure comprises discontinuing reception during a time period defined by a determined inter-SS Block beam sweep time interval and/or inter SS-Burst time interval.

20. The method of claim 11, wherein the beam sweep measurement window is used to control discontinuous reception (DRX).

21. The method of claim 11, wherein the updating of the beam sweep reception procedure comprises a consideration of wireless device specifics comprising energy availability, battery status and/or criticality of applications supported by the wireless device.

22. A wireless device arranged for introducing beam sweep measurement instants in a wireless device, the wireless device comprising:
    radio circuitry arranged for transmission and reception of radio signals;
    processing circuitry arranged to cause:
        reception of one or more beams, each comprising at least one control signal comprising beam sweep properties;
        obtaining of the beam sweep properties from the control signal;
        determining of a beam sweep measurement window comprising one or more measurement instants, based on the obtained beam sweep properties;
        updating a beam sweep reception procedure in the wireless device based on the determined beam sweep measurement window; and
        applying the updated beam sweep reception procedure during one or more subsequent beam sweep cycles.

* * * * *